(12) United States Patent
Price

(10) Patent No.: US 7,360,799 B1
(45) Date of Patent: Apr. 22, 2008

(54) INSULATION CLADDING FOR BENDS

(76) Inventor: Todd C. Price, 3973 Annabelle Ave., Roseville, CA (US) 95661

( * ) Notice: Subject to any disclaimer, the term of this patent is extended or adjusted under 35 U.S.C. 154(b) by 117 days.

(21) Appl. No.: 10/920,587

(22) Filed: Aug. 17, 2004

(51) Int. Cl.
*F16L 43/00* (2006.01)
*F16L 59/14* (2006.01)

(52) U.S. Cl. .................. 285/179; 285/183; 285/47; 138/149

(58) Field of Classification Search ........... 285/179, 285/179.2, 181, 182, 183, 47, 48, 53; 138/149
See application file for complete search history.

(56) References Cited

U.S. PATENT DOCUMENTS

| | | | | |
|---|---|---|---|---|
| 119,621 A * | 10/1871 | Leas et al. | ........... | 29/525.06 |
| 296,786 A * | 4/1884 | Rock | ........... | 285/183 |
| 555,494 A * | 3/1896 | Briggs | ........... | 285/183 |
| 970,956 A * | 9/1910 | Ruddell | ........... | 406/167 |
| 2,823,703 A * | 2/1958 | Nusser, Jr. | ........... | 285/181 |
| 3,153,546 A * | 10/1964 | Dunn | ........... | 285/13 |
| 3,157,204 A * | 11/1964 | Phillips | ........... | 138/137 |
| 4,327,778 A * | 5/1982 | Williams | ........... | 138/149 |
| 4,694,547 A * | 9/1987 | Broussard | ........... | 29/890.149 |
| 6,752,176 B1 * | 6/2004 | Price et al. | ........... | 138/109 |
| 6,921,564 B1 * | 7/2005 | Keenan | ........... | 428/36.91 |

\* cited by examiner

*Primary Examiner*—James M. Hewitt
(74) *Attorney, Agent, or Firm*—Heisler & Associates

(57) ABSTRACT

A half elbow used with a second similar half elbow clads insulation or other structures about a bend. Each half elbow is formed of separate segments of thin sheet material fastened together. Each segment includes first and second edges adapted to be fastened to corresponding second and first edges of adjacent segments. The segments are fastened together and shaped so that they form a curving contour between outside edges and inside edges of the segments. The outside edges of the segments together form an outside seam and the inside edges of the segments together form an inside seam. Two outside seams of two half elbows can be joined together along with two inside seams of the two half elbows to entirely surround and cover a bend.

15 Claims, 5 Drawing Sheets

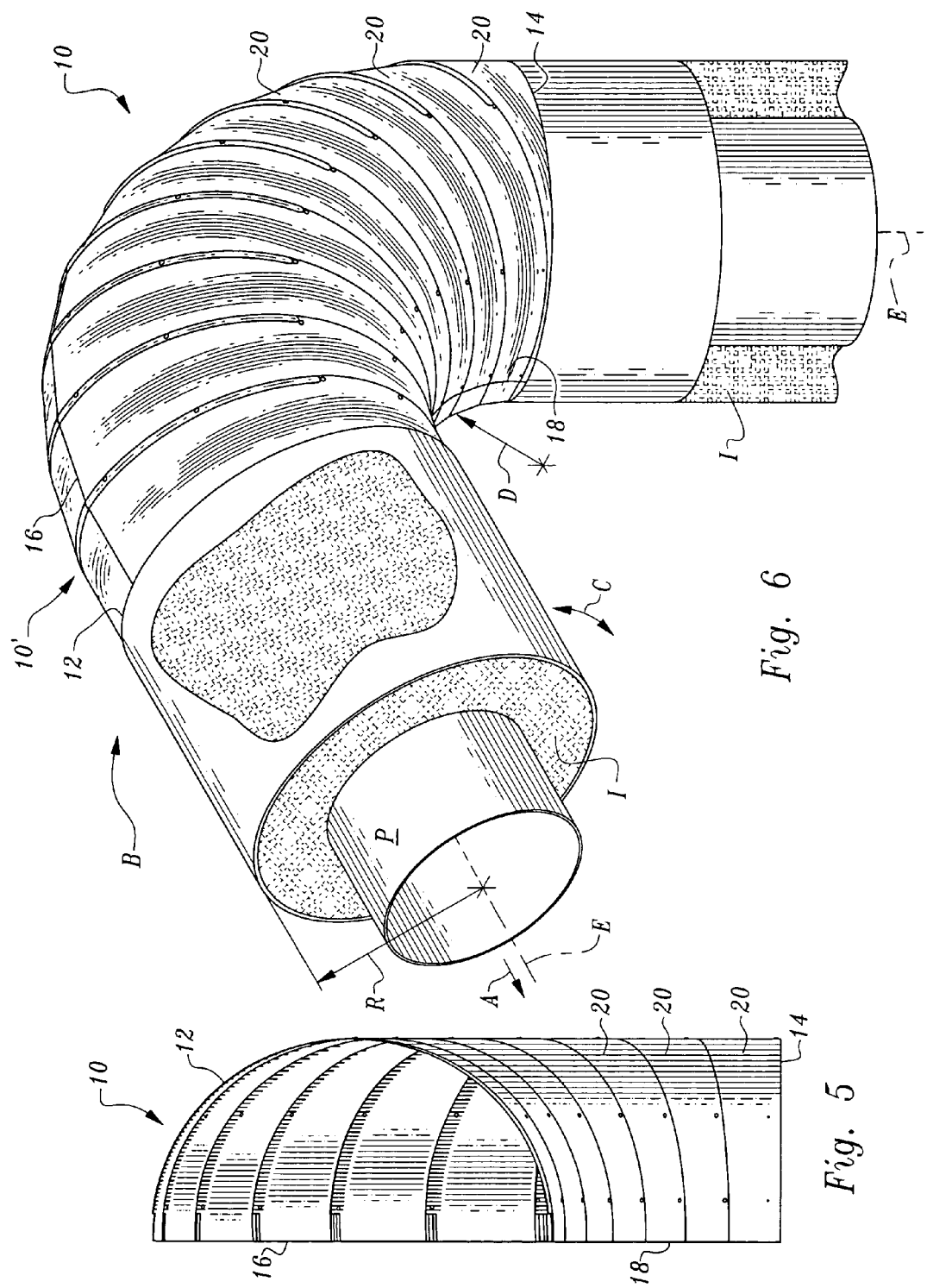

INSULATION CLADDING FOR BENDS

FIELD OF THE INVENTION

The following invention relates to insulation cladding and other sheet metal structures. More particularly, this invention relates to sheet metal structures which are particularly configured to facilitate rapid and high quality cladding of insulation surrounding a bend in a pipe and for covering the surfaces of other analogous structures or spaces.

BACKGROUND OF THE INVENTION

When materials are transported by a pipe or other duct, such as within industrial facilities and HVAC systems, it is often desirable for the pipe to be insulated. Typically, such insulation is provided by wrapping a layer of insulation around an exterior surface of the pipe. Often this insulation is made from a material which exhibits degraded performance if exposed directly to the weather or other atmospheric conditions surrounding the pipe. In other instances, the insulation does not have a particularly desirable appearance, or is prone to falling off. Insulation cladding is utilized to cover an exterior surface of the insulation surrounding the pipe so that the insulation is held, protected and hidden from view by the cladding.

Such insulation cladding is typically formed from thin sheets of sheet metal (often formed of aluminum or stainless steel) shaped to cover the insulation and riveted together or otherwise fastened to encapsulate the insulation therein. Such insulation cladding thus provides both a decorative function while also protecting the insulation from damage.

One difficulty encountered while installing such cladding involves properly installing cladding surrounding insulation at a bend in the pipe. At such bends, it is desirable to have the cladding curve with the insulation surrounding the pipe. The cladding must thus take on a complex geometric shape generally in the form of a cylinder with a central axis thereof bent about a bend radius of curvature. The cladding must be generally cylindrical, but with a curvature following this bent central axis. Hence, an outside portion of the bend is significantly longer than an inside portion of the bend.

One prior art technique commonly used by sheet metal contractors to install cladding around a bend involves the painstaking custom construction of a bend cladding structure on-site from separate strips of cladding material. These separate strips, often referred to as gores, are sized and shaped to circumscribe the central axis of the bend. These gores thus have an elongate form with a length between ends thereof similar to a circumference of the bend surrounding the central axis.

Each gore has a tapering width with portions of the gore having a small width corresponding with an inside of the bend and with portions of the gore having a larger width corresponding with an outside of the bend. Typically, each gore will have a similar size and geometry. After the gores have been formed, they can be crimped to take on a curved form, or merely be wrapped around the bend. Each of the gores are wrapped around the bend in sequence and fastened to adjacent gores so that the bend is built from one end of the bend to the other end of the bend.

This process of custom manufacturing the cladding from multiple separate gores requires the sheet metal subcontractor to have all of the necessary sheet metal cutting and shaping equipment at the installation site and involves the complex and time consuming procedures associated with such custom manufacture, thus delaying the time associated with the cladding process. The time and difficulty associated with this project is magnified when, as is typically the case, multiple bends are involved which each require appropriate cladding.

A second prior art technique for cladding bends involves the use of prefabricated pressed half bends. A sheet metal press is provided including upper and lower dies with multiple different standard sizes. When the dies are pressed together, the sheet metal therebetween is pressed into the shape that the cladding must take to cover one half of the bend of a particular size and shape bend of insulation. Two identical pressed half bends can then be mated together to form the completed cladding for the particular bend involved. Such pressed half bends typically terminate at seams which are configured to include an inside seam corresponding with the inner radius of curvature of the bend and an outside seam corresponding with an outer radius of curvature of the bend. Thus, the two pressed half bends of identical form each cover the symmetrical opposite sides of the bend. During installation the two halves are riveted together to form the completed structure.

Utilization of such pressed half bends involves numerous drawbacks. Such pressed half bends are limited to particular diameter sizes surrounding the central axis, and particular radii of curvature of the central axis through the bend. Also, an angular form of the bend (i.e. 30°, 45°, 90°, etc.) further increases the number of bend shapes and sizes which must be accommodated by such pressed halves. As each particular shape and size requires a separate press with separate upper and lower dies, such pressed halves have not been able to accommodate all of the different geometries and sizes which exist and require appropriate cladding.

Also, for particularly large bends and for many geometries, the nature of the curve is not well suited to pressing planar sheet metal into a half bend without damaging the sheet metal during the pressing process or involving unacceptably complex press and die configurations. Finally, the pressed half bends have a significantly different appearance from that associated with forming the bends from multiple separate pieces of cladding material. In many installations where appearance is a consideration, the pressed half bends have an undesirable appearance.

Accordingly, a need exists for providing insulation cladding for bends in a way that provides for quick installation, ease of use and desirable appearance for the cladding surrounding the bends. Such cladding should be readily installed on-site, with a minimal amount of skill, effort, time and tools required at the installation site.

SUMMARY OF THE INVENTION

With this invention insulation cladding is provided for bends in the form of half elbows, a pair of which can be coupled together to clad bends in insulation or other bends requiring a sheet metal covering thereon. Each half elbow is made up of separate segments. The segments are preferably similar in size and geometry including a generally linear first edge opposite a generally linear second edge. An outside edge joins the first and second edges together at one end of the segment. An inside edge joins the first and second edges together at an opposite end of the segment. A length of the segments between the inside edge and the outside edge is preferably approximately half of a diameter of the bend. The length of the inside edge and outside edge are different from each other by appropriate amount so that the radius of curvature of the bend is accommodated.

The segments are fastened together, such as with rivets. The segments can also be encouraged to take on a curving form by being crimped along portions of the second edge and formed with a rib along portions of the first edge. When all of the segments have been attached together, the outside edges together form a curving contour defining an outside seam for the half elbow. Similarly, the inside edges of each of the segments together form a curving inside seam for the half elbow. Two such half elbows can then be later fastened together at an installation site, such as through the use of rivets, to complete the cladding of the insulation or other structures or space surrounding the bend.

In an alternative embodiment a negative radius half elbow is provided which allows for a sharper bend in the insulation to be clad with two such negative radius half elbows. Particularly, with the negative radius half elbow two end segments are provided unique from multiple intermediate mid segments. The mid segments are shortened relative to the segments of the preferred embodiment, so that they do not pass around an entire half exterior circumference of the bend. The end segments are attached to each other adjacent an inside seam of the negative radius half elbow. At the outside seam, the end segments are spaced from each other and have the outside edges of mid segments interposed therebetween.

The half elbows of this invention would typically be manufactured in a controlled environment separate from the installation site and fabricated to various different bend diameters and bend radii of curvature, and to other geometric shapes. The half elbows would then be delivered in the appropriate number and size to an installation site for final installation. The installer needs to merely rivet the two half elbows together, without additional fabrication being typically required at the installation site.

OBJECTS OF THE INVENTION

Accordingly, a primary object of the present invention is to provide insulation cladding at locations where the insulation follows a bend in a pipe, or analogous uses where sheet metal is required to surround an exterior contour of a bend.

Another object of the present invention is to provide insulation cladding for bends which cladding has been preassembled into half elbows so that the entire bend can be covered by attaching two halves together surrounding the bend.

Another object of the present invention is to provide insulation cladding for bends which can be readily manufactured to a high number of different diameters, radii of curvature and angular extent of bends, as well as other bend size parameters.

Another object of the present invention is to provide insulation cladding for bends which has a desirable exterior appearance.

Other further objects of the present invention will become apparent from a careful reading of the included drawing figures, the claims and detailed description of the invention.

BRIEF DESCRIPTION OF THE DRAWINGS

FIG. 5 is a left side elevation view of that which is shown in FIG. 1.

FIG. 6 is a perspective view of that which is shown in FIG. 1, shown installed upon a bend in a pipe with insulation surrounding the pipe and with the half elbow of FIG. 1 surrounding the bend in the pipe according to this invention. A similar second half elbow is shown coupled to the first half elbow on an opposite side of the bend so that the bend is entirely surrounded with cladding in the form of the two half elbows. Portions of cylindrical cladding are cut away, along with portions of the insulation and the pipe to further illustrate a typical installation for the half elbow.

DESCRIPTION OF THE PREFERRED EMBODIMENT

Figure 1:
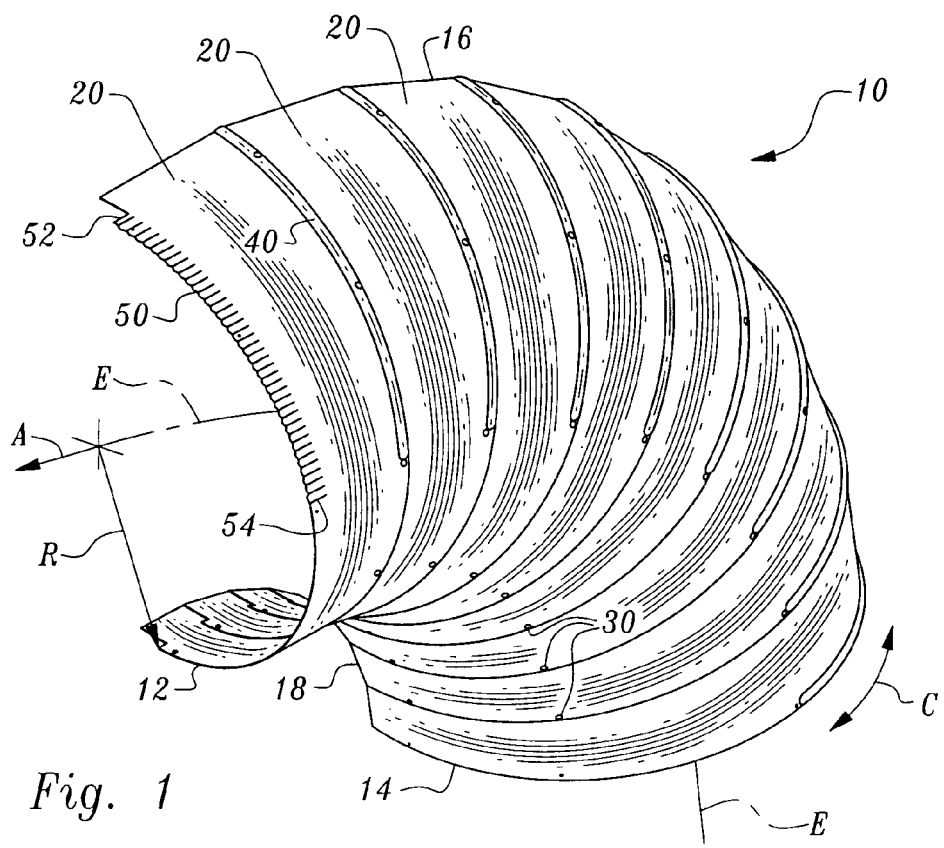
FIG. 1 is an outside perspective view of a half elbow of cladding formed according to a preferred embodiment of this invention.

Referring to the drawings, wherein like reference numerals represent like parts throughout the various drawing figures, reference numeral 10 (FIG. 6) is directed to a half elbow of sheet metal material for use in surrounding a bend B, such as to clad insulation I surrounding a pipe P at a bend B in the pipe P. Where the half elbow 10 is utilized to clad insulation I, the insulation I typically surrounds a pipe P extending along a central axis E. The half elbow 10 extends in a circumferential direction C maintaining a distance away from the central axis E which is constant and equal to a radius R desired for the cladding formed by the half elbow 10. The half elbow 10 is used along with a second half elbow 10' to entirely clad the insulation I surrounding the bend B in the pipe P.

Figure 2:
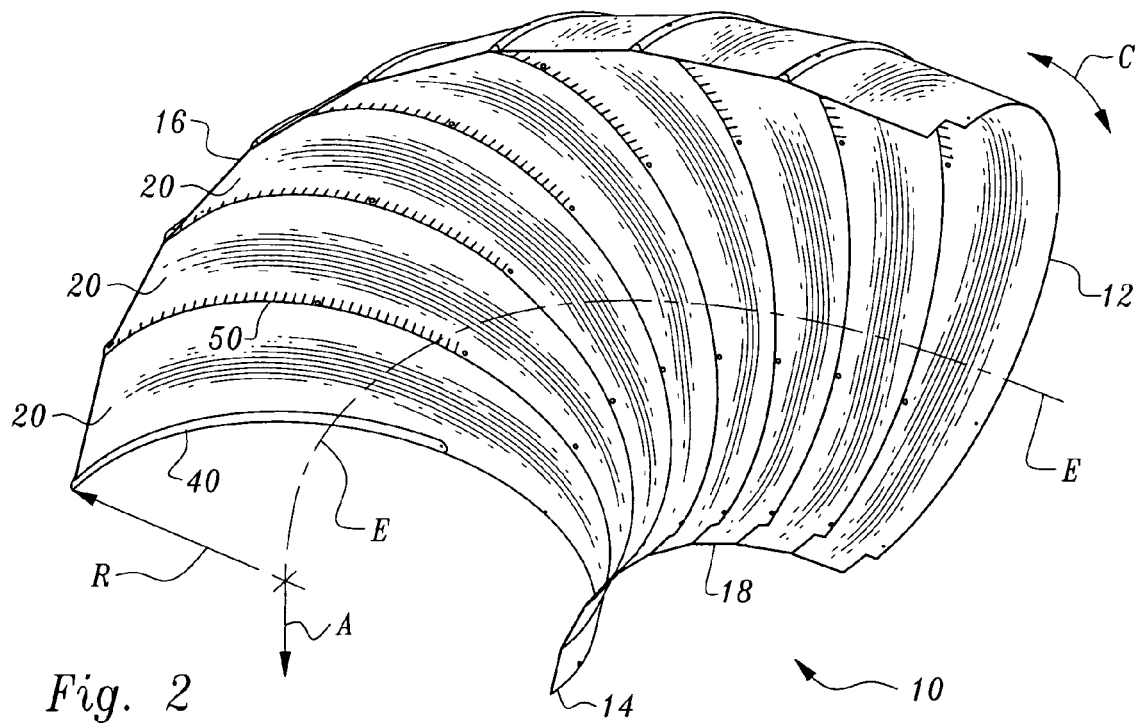
FIG. 2 is an inside perspective view of that which is shown in FIG. 1.
Figure 3:
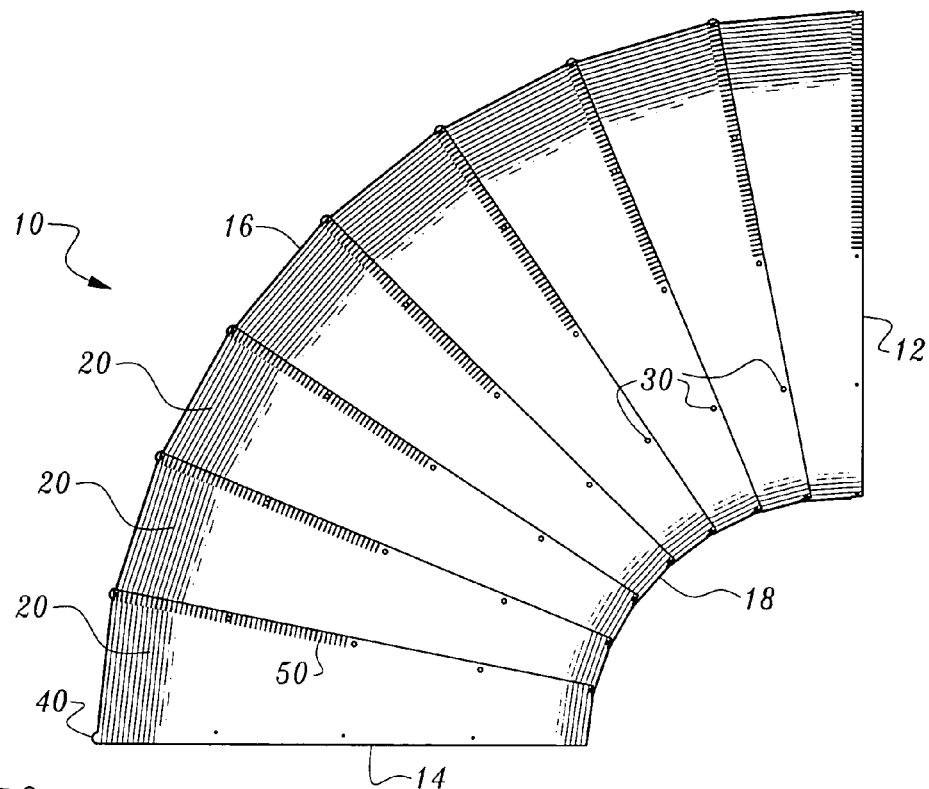
FIG. 3 is a rear elevation view of that which is shown in FIG. 1.
Figure 4:
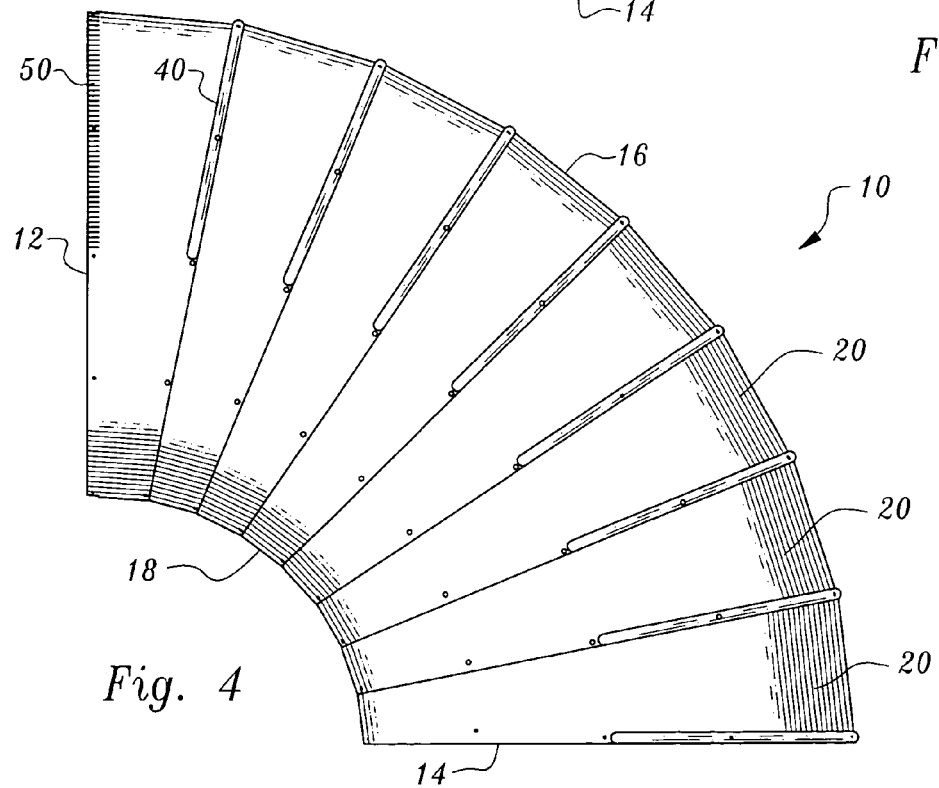
FIG. 4 is a front elevation view of that which is shown in FIG. 1.
Figure 7:
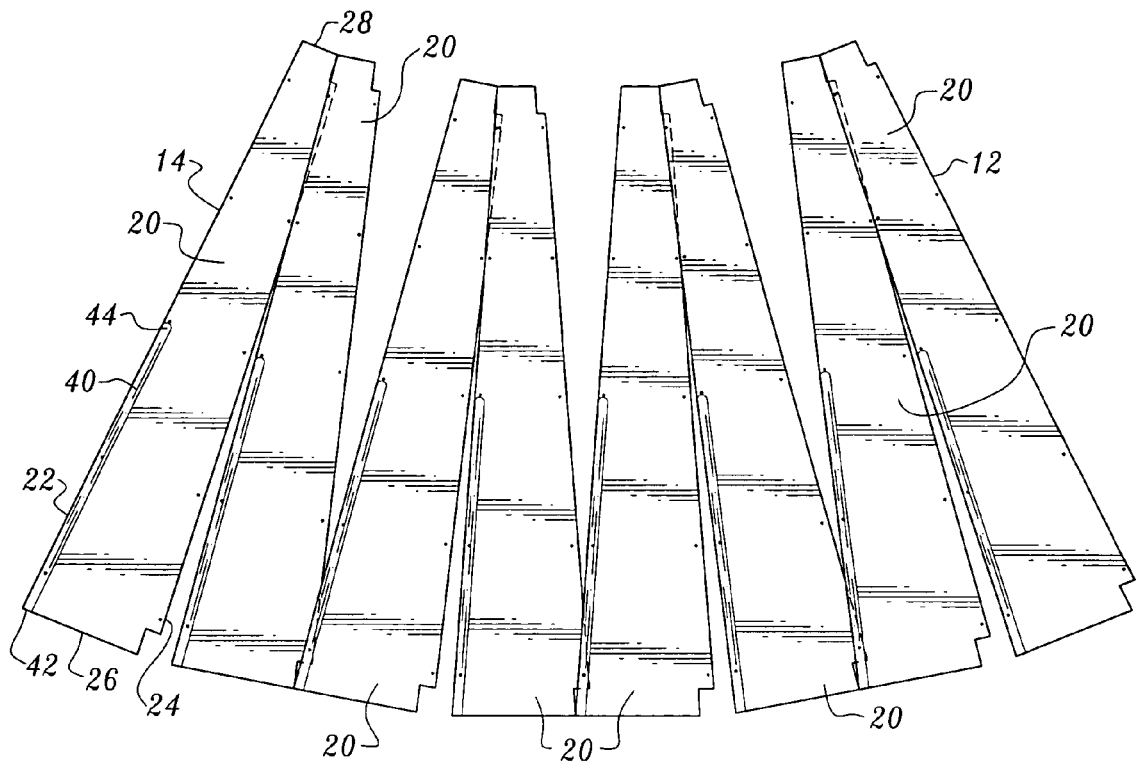
FIG. 7 is an exploded parts view of the half elbow of FIG. 1 with the separate segments thereof separated partially from each other and laid flat, generally illustrating the configuration of the segments before they are riveted together to form the half elbow of this invention.

In essence, and with particular reference to FIGS. 1 and 2, basic details of the half elbow 10 are described. The half elbow 10 includes multiple separate segments 20 which together form the half elbow 10 extending from a first end 12 to a second end 14. The segments 20 have a geometry which allows them to extend circumferentially (about arrow C) surrounding the central axis E, from an outside seam 16 to an inside seam 18. The multiple segments 20 are attached together, such as with rivets 30, to form the entire half elbow 10. Portions of edges of the segments 20 are preferably fitted with ribs 40 or crimping 50 to assist the segments 20 in taking on their curving contour. The half elbow 10 is formed in various different sizes based on the desired radius R, length of the central axis E, and radius of curvature D (FIG.

6) so that bends B of various different sizes can be accommodated by a pair of similar half elbows 10, 10' fastened together.

More specifically, and with particular reference to FIGS. 1-6, the particular details of the half elbow 10 are described. The half elbow 10 is preferably in the form of half of a thin walled tubular construct which has a constant radius R away from a curving central axis E. The half elbow 10 is thus configured to be a curving surface both curving about the central axis E and curving along the radius of curvature D (FIG. 6).

The half elbow 10 includes a first end 12 opposite a second end 14. The first end 12 is semi-circular and is adapted to be attached to cylindrical cladding formed around a straight section of pipe P, or attached to other appropriate structures or space depending on the particular installation involved. Similarly, the second end 14 is semi-circular and would attach to corresponding structures on the end of the bend B away from the first end 12.

The half elbow 10 includes an outside seam 16 opposite an inside seam 18. The outside seam 16 preferably follows a longest curving path around an outside of the bend B. The inside seam 18 is opposite the outside seam 16 and follows a shortest curving path on an inside of the bend B. The outside seam 16 and inside seam 18 are preferably aligned within a common plane which bisects the entire bend and in which the central axis E remains as the central axis E curves to form the bend B. The inside seam 18 is shorter than the outside seam 16 to accommodate the curving nature of the half elbow 10.

While the half elbow 10 is shown following a central axis E which bends 90° as the central axis E extends along arrow A (FIG. 1), bends of lesser or greater amount could similarly be accommodated with an appropriately modified half elbow. For instance, angular measurements of 30°, 45°, 60°, 120° or other angular measurements could be accommodated by merely adding more segments 20 or otherwise altering the dimensions of the half elbow 10 particularly described herein.

Also, while provision of the half elbow 10 is particularly convenient, it is conceivable that partial elbows in amounts other than halves could be provided. For instance, four separate quarter elbows could be provided in a form similar to the half elbows but with the half elbows cut in half compared to their depiction in the figures contained herein. With such quarter elbows, both outside seams 16, inside seams 18, and two side seams would be provided to allow the quarter elbows to circumscribe a bend.

Also, while the half elbows 10 are typically used in pairs which are identical to surround the bend B, it is conceivable that the half elbows 10 could be provided with different configurations such as with one of the half elbows configured to overlie the outside portion of the bend and with a second half elbow unique from the first half elbow configured to cover the inside portion of the bend, with the two different elbows still being mated together to surround the bend B.

In the preferred embodiment according to this invention, the elbows are in the form of half elbows 10, 10' which are of similar form to minimize inventory necessary. Furthermore, the radius R of the half elbow 10 is shown and described herein as being constant, but could taper from the first end 12 to the second end 14, such as to accommodate an installation site where the insulation I or other material or space to be clad tapers from a lesser diameter to a greater diameter.

With particular reference to FIGS. 1-5 and 7, details of each of the segments 20 which together form the half elbow 10 are described in detail. Each of the segments 20 is a separate structure formed of thin cladding material. Most typically, the segments 20 are formed of aluminum or stainless steel to provide a desired level of corrosion resistance and appearance. However, any thin metal or non-metal material could be utilized according to this invention. Often one surface of the cladding material is provided with a coating, such as a moisture barrier in the form of a paper liner, to enhance the performance of the cladding material.

Each of the segments 20 typically is initially provided in the form of a portion of a flat sheet. The flat sheet is cut so that the segments 20 are provided. Preferably, each of the segments 20 are similar in size and shape with each half elbow 10 to be formed. Segments 10 of different sizes and shapes would be used together to form half elbows 10 having different dimensions.

Each of the segments 20 thus preferably includes a first edge 22 opposite a second edge 24. The first edge 22 and second edge 24 are preferably linear and define a length of the segments 20, with a width of the segments 20 defined as a spacing between the first edge 22 and the second edge 24. Preferably, the first edge 22 and second edge 24 are linear but angled relative to each other so that a width of the segments 20 varies. An outside edge 26 extends between the first edge 22 and second edge 24 where the first edge 22 and second edge 24 diverge the most from each other. An inside edge 28 is provided opposite the outside edge 26.

The outside edges 26 of each of the segments 20 together form the outside seam 16 of the half elbow 10 after the segments 20 have been fastened together. The inside edges 28 of the segments 20 together form the inside seam 18 of the half elbow 10 after all of the segments 20 have been fastened together. The inside edge 28 is shorter than the outside edge 26 by an amount in proportion to a difference in the length of the inside seam 18 relative to the outside seam 16.

Each of the segments 20 are also sized to accommodate a certain amount of overlap between adjacent segments 20 to form the half elbow 10. Preferably, the second edge 24 is notched adjacent the outside edge 26. This notch helps in aligning the segments 20 so that the appropriate amount of overlap (equal to a depth of the notch) can be quickly and conveniently provided. A similar notch is also provided at the corner between the second edge 24 and the inside edge 28. By varying the depth of these notches, the amount of overlap between the segments 20 can be varied in a convenient fashion with this variation in overlap further facilitating formation of the curvature of the half elbow 10 desired, while still maintaining sufficient overlap so that the rivets 30 can pass through both of the segments 20.

To enhance the ability of the segments 20 to take on a curving shape in the formation of the half elbow 10, each of the segments 20 preferably includes a rib 40 formed along at least a portion of the first edge 22 of each of the segments 20. The rib 40 preferably extends from an outside tip 42 adjacent the outside edge 26 to a medial tip 44 midway between the outside edge 26 and the inside edge 28. The rib 40 preferably extends parallel with and adjacent to the first edge 22. This rib 40 is typically pressed into the segment 20 with this pressing process tending to cause the segment 20 to take on a curve somewhat. With the rib 40 formed into the segment 20, a width of the segment 20 where the rib 40 is located is slightly shortened, so that when the segments 20 are attached together the curving surface of the half elbow 10 is further facilitated.

The segments 20 preferably additionally include crimping 50 along at least portions of the second edge 24. Particularly, crimping 50 is preferably provided along the second edge 24 from an outside end 52 adjacent the outside edge 26 to a medial end 54 halfway between the outside edge 26 and the inside edge 28. This crimping 50 is preferably provided along the second edge 24 so that the crimping 50 of each segment 20 is directly opposite the rib 40 forming each segment 20. Similar to the rib 40, the crimping 50 acts to assist the segments 20 in taking on the curving nature required to form the half elbow 10.

The segments 20 are fastened together with the first edge 22 of each segment 20 attached to an adjacent second edge 24 of an adjacent segment 20. The segment 20 adjacent the first end 12 and second end 14 of the half elbow 10 include either a first edge 22 or second edge 24 with no other structures attached thereto until final installation occurs.

Preferably, rivets 30 are provided passing through both the first edge 22 and second edge 24 to secure adjacent segments 20 together. The ribs 40 adjacent the first edge 22 would typically overlie the crimping 50 on the second edge 24 of the adjacent segment 20. Rivets 30 would also be used on portions of the segments 20 where no such ribs 40 or crimping 50 are provided.

While rivets 30 provide a preferred form of fastener to join the segments 20 together, other fasteners could also be utilized separately or in combination. For instance, adhesive could be utilized to bond the edges 22, 24 of adjacent segments 20 together. Also, screws, such as sheet metal screws, could be utilized to fasten the segments 20 together. Other fasteners including staples, tacks, magnets, or any other suitable fasteners could similarly be utilized. Where water migration preclusion is important, appropriate caulking or other sealing can be performed along joints between the segments 20. In some applications it may also be desirable to weld the segments 20 to each other both as a form of fastener and to seal the segments 20 together.

Once the entire half elbow 10 has been formed by fastening the multiple segments 20 together, the half elbow 10 is ready for installation. Typically the half elbow 10 would be maintained in inventory along with various different half elbows of different dimensions. When a particular installation calls for the cladding of a particular bend B, two identical half elbows are selected having the appropriate dimensions for cladding this bend B. These two half elbows 10 are then transported to the installation site. The two half elbows are placed opposite each other surrounding the insulation I or other structure or space to be clad (FIG. 6). Finally, rivets or other fasteners are typically utilized to join the two half elbows 10, 10' to each other along the seams 16, 18 to complete the bend B cladding process.

While the above described half elbow 10 can be altered to fit multiple different dimensions of bends, some bends are particularly sharp, or require a greater amount of insulation or other space between the pipe P and the cladding than can be naturally accommodated by the sharpness of the bend B in the pipe P. In such a configuration the half bend 10 of the preferred embodiment is preferably substituted with an alternative embodiment negative radius half elbow 110. This negative radius half elbow 110 is similar to the half elbow 10 of the preferred embodiment except where particularly described herein, along with reference to FIGS. 8-10.

Figure 8:
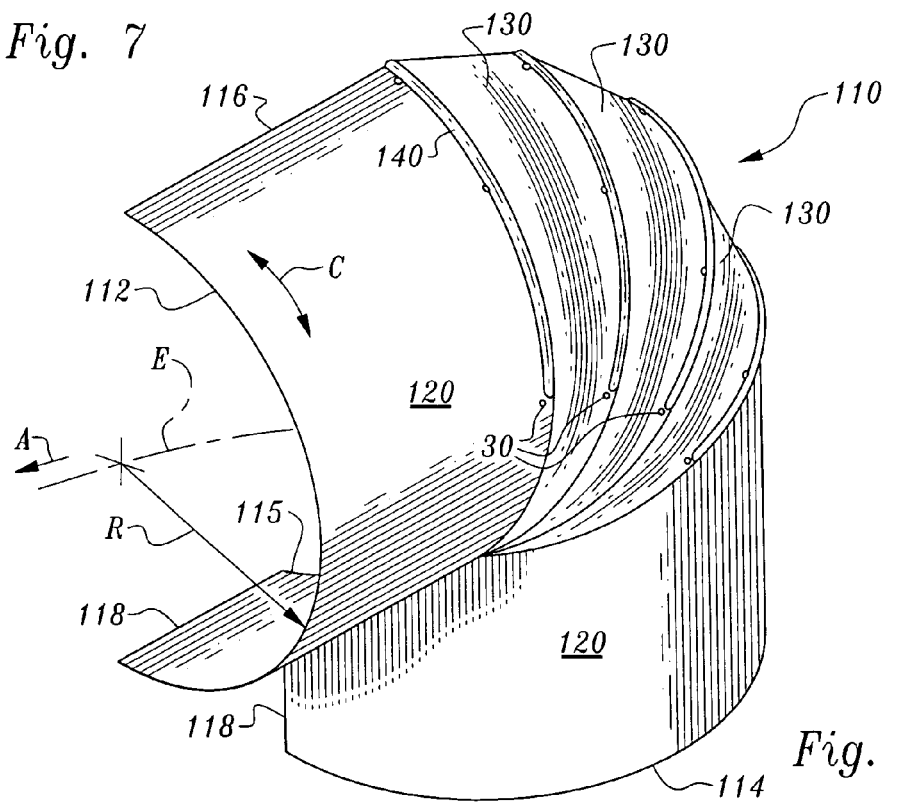
FIG. 8 is a perspective view of an alternative embodiment of that which is shown in FIG. 1 with a particular negative radius half elbow shown.
Figure 9:
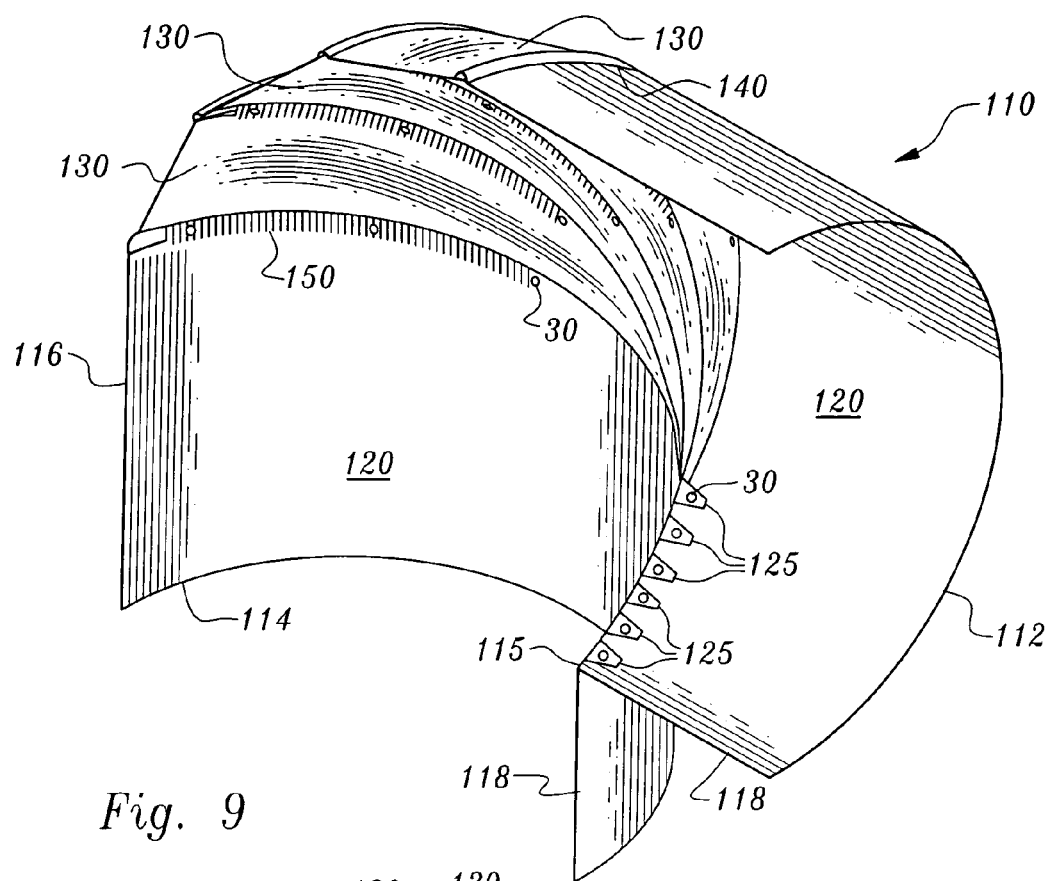
FIG. 9 is a perspective view of that which is shown in FIG. 8 from a reverse angle.
Figure 10:
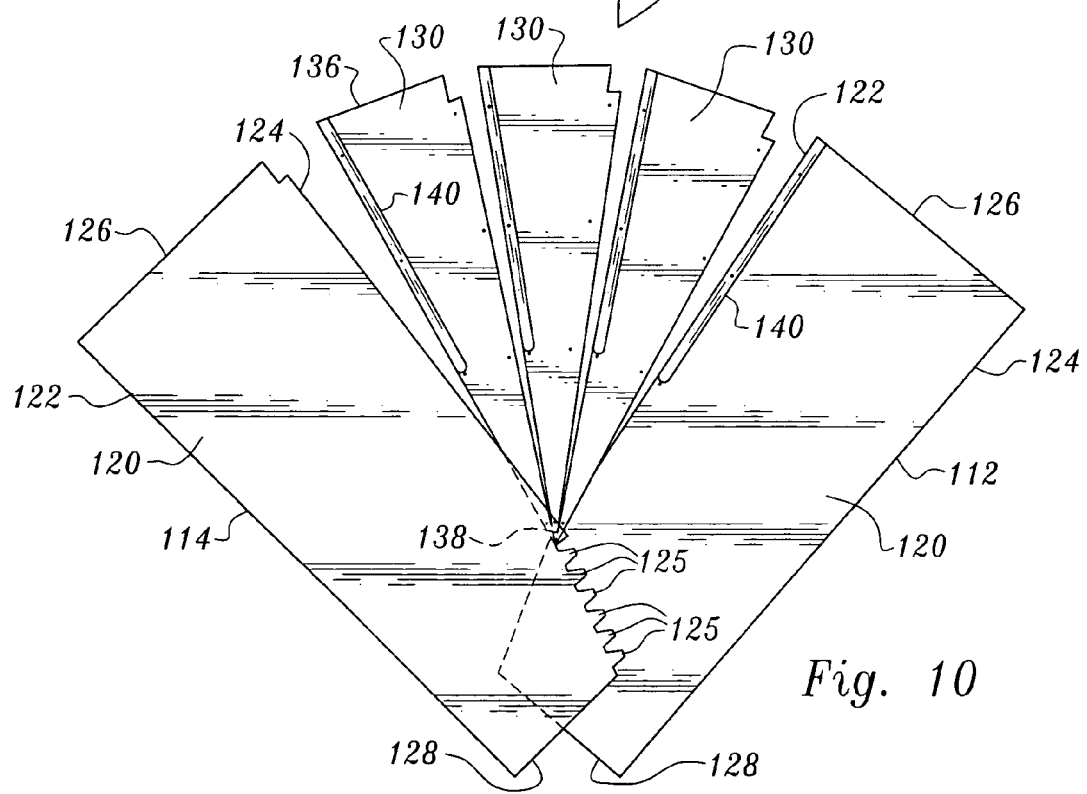
FIG. 10 is an exploded parts view of that which is shown in FIG. 8 with the various end segments and mid segments shown partially exploded away from each other and generally illustrating the configuration of the end segments and mid segments before they are attached together and curved to form the negative radius half elbow of the alternative embodiment of FIG. 8.

The negative radius half elbow 110 includes a first end 112 opposite a second end 114 and an outside seam 116 opposite an inside seam 118. Uniquely, the inside seam 118 does not follow a continuous curve. Rather, the inside seam 118 is linear both above and below a crease 115 (FIGS. 8 and 9). The outside seam 116 follows a curve similar to the outside seam 16 of the half elbow 10 of the preferred embodiment except that the outside seam 116 of the negative radius half elbow 110 is relatively sharper.

With this negative radius half elbow 110, two separate types of segments are utilized including end segments 120 and mid segments 130. Each of these segments 120, 130 include ribs 140 and crimping 150 corresponding with the ribs 40 and crimping 50 of the preferred embodiment.

The two end segments 120 are utilized to form portions of the negative radius half elbow 110 adjacent the first end 112 and the second end 114. The end segments 120 include a first edge 122 of generally linear form opposite a second edge 124 of generally linear form. The first edge 122 and second edge 124 are not parallel, but rather taper relative to each other so that a width of the end segments 120 varies between the first edge 122 and second edge 124.

An outside edge 126 joins an end of the first edge 122 and second edge 124 together adjacent the outside seam 116. The inside edge 128 on each of the two end segments 120 forms the entire inside seam 118 of the negative radius half elbow 110. The end segments 120 are preferably either provided with a rib 140 or crimping 150 on only one edge 122, 124 thereof with that edge being the edge facing mid portions of the negative radius half elbow 110.

Tabs 125 preferably extend from the second edge 124 on at least some of the end segments 120. The tabs 125 are adapted to be bent 90° to provide an area for fastening along the crease 115 adjacent the inside seam 118.

The gap between the two end segments 120 is filled with mid segments 130. The mid segments 130 do not extend entirely from the outside seam 116 to the inside seam 118. Rather, they extend from the outside seam 116 at an outside edge 136 to an inside tip 138 which stops short of the crease 115. The mid segments 130 thus have a generally triangular shape with the outside edge 136 forming a portion of the outside seam 116 and the inside tips 138 terminating adjacent the crease 115 and short of the inside seam 118. When appropriate fasteners are utilized to attach the mid segments 130 together and to the end segments 120, the completed negative radius half elbow 110 is provided for use in surrounding insulation such as that around a pipe with a particularly sharp bend. As with the half elbow 10 of the preferred embodiment, the negative radius half elbow 110 can be provided in various different dimensions, and with various different angles of bend accommodatable.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. Cladding for a portion of a bend, comprising in combination:

a plurality of separate segments in the form of thin sheets of cladding material;

each said segment including a first edge opposite a second edge;

said first edge non-parallel with said second edge;

at least one fastener between adjacent segments, said fastener adapted to couple said first edge of one of said segments to said second edge of an adjacent said segment;

said first edge and said second edge adapted to extend only partially around the bend in a circumferential direction;

wherein said first edge includes a rib thereon extending along at least a portion of said first edge;

wherein said rib extends only partially along said first edge, with said rib shorter than a length of said first edge and with said rib located closer to an end of said first edge which is most distant from said second edge;

wherein said second edge includes crimping along at least a portion of said second edge; and wherein said crimping extends adjacent only a portion of said second edge, said crimping located closer to an end of said second edge which is most distant from said first edge.

2. The cladding of claim 1 wherein an outside edge extends between said first edge and said second edge; and wherein inside edges are provided on each said segment opposite said outside edges, said inside edges having a length shorter than said outside edges.

3. The cladding of claim 2 wherein said inside edges of adjacent said segments are aligned together to form an inside seam.

4. The cladding of claim 3 wherein said inside seam is co-planar with said outside seam and co-planar with a plane that is adapted to bisect the bend and said plane adapted to have a central axis of the bend lie therein.

5. The cladding of claim 2 wherein said fasteners include rivets.

6. The cladding of claim 1 wherein said first edge and said second edge have lengths substantially similar to each other and each adapted to extend approximately halfway around the bend.

7. A method for manufacturing a half bend of insulation cladding, for attachment to another half bend to enclose a bend in insulation, including the steps of:

providing a plurality of segments in the form of thin sheets of cladding material, the segments each shaped to include a first edge opposite a second edge, and an outside edge extending between the first edge and the second edge;

coupling the segments together with at least some of the first edges coupled to some of the second edges, with the outside edges of adjacent segments aligned together to form an outside seam, the outside seam having a curving contour, and portions of at least some of the segments opposite the outside edge aligned together to form an inside seam spaced from the outside seam;

forming a rib adjacent the first edges of the segments and extending along at least a portion of the segments;

crimping the second edge along at least a portion of the second edge; and wherein said crimping step includes the step of limiting the crimping to only a portion of the second edge closest to the outer seam.

8. The method of claim 7 wherein said rib forming step includes the step of limiting a length of the rib to only a portion of the first edge closest to the outer seam.

9. The method of claim 8 wherein said coupling step includes the step of riveting the first edge of one of the segments to the second edge of an adjacent segment.

10. The method of claim 7 including the further step of forming the first edge to be non-parallel with the second edge.

11. The method of claim 10 wherein said forming step includes the step of deviating the first edge away from the second edge sufficiently to cause the segments to together achieve a bent cylinder form when the first edges and the second edges of adjacent segments are coupled together by said coupling step.

12. The method of claim 7 including the further step of configuring the segments to follow a 90° bend.

13. The method of claim 7 including the further step of configuring the segments to follow a 45° bend.

14. The method of claim 7 including the further steps of:

providing at least a portion of the segments with inside edges opposite the outside edges; and aligning the inside edges of adjacent segments to form an inside seam having a curving contour.

15. The method of claim 7 including the further step of configuring the inside seam to be co-planar with the outside seam.

* * * * *